UNITED STATES PATENT OFFICE.

GEORG MERLING AND OTTO CHRZESCINSKI, OF ELBERFELD, AND HUGO KÖHLER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING KETO COMPOUNDS FROM KETONES AND TETRAALKYL-DIAMINOMETHANES.

1,094,160.  Specification of Letters Patent.  Patented Apr. 21, 1914.

No Drawing.  Application filed May 16, 1913.  Serial No. 768,072.

*To all whom it may concern:*

Be it known that we, GEORG MERLING, OTTO CHRZESCINSKI, and HUGO KÖHLER, doctors of philosophy, chemists, citizens of the German Empire, residing at, respectively, Elberfeld and Leverkusen, near Cologne-on-the-Rhine, Germany, have invented new and useful Improvements in Processes of Producing Keto Compounds from Ketones and Tetraalkyldiaminomethanes, of which the following is a specification.

The present invention concerns the production of keto compounds containing the radical:

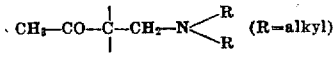   (R=alkyl)

which have proved to be valuable intermediate products for the manufacture of érythrene and its homologues.

The process for their production consists in treating ketones such as acetone and its homologues with the homologues of tetramethyldiaminomethane e. g. tetraethyldiaminomethane either with or without condensing agents, such as caustic alkalis, alkali carbonates and bicarbonates, alkaline earths, aluminium hydrate, sodium phosphate, organic bases and salts. The condensation proceeds although slowly even at ordinary temperature and without condensing agents and the presence or absence of water or of other solvents does not interfere with the reaction. Heating and condensing agents accelerate the reaction. The homologues of tetramethyldiaminomethane can be used as such or as mixtures of formaldehyde- and dialkylamin solutions in the proper molecular proportions. These reactions proceed e. g. according to the following equation:

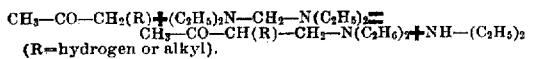
(R=hydrogen or alkyl).

Besides this product ketodiamins of the formula:

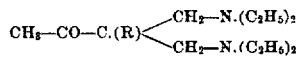

are obtained for instance by the two-fold introduction of the residue

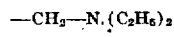

into the corresponding ketone. These ketodiamins can be separated from the ketomonoamins by fractional distillation.

In order to illustrate the new process more fully the following examples are given, the parts being by weight:—

Example 1.—Production of beta-acetylethyldiethylamin and beta-acetyltrimethylenetetraethyldiamin from tetraethyldiaminomethane and acetone: 750 parts of aqueous formaldehyde (40 per cent.) are gradually dropped into 3245 parts of aqueous diethylamin solution (45 per cent.) which is being stirred and cooled and 2000 parts of acetone, 400 parts of baryta-water (saturated at ordinary temperature) and 500 parts of water are then added. After 20 days' heating from 25–30° C. bicarbonate is added to the brown solution in order to remove the baryta. Barium carbonate is removed by filtration. The oil is separated with potash and dried over potash. The excess of acetone is removed by distillation *in vacuo* and the remaining mixture of bases is decomposed by a fractional distillation *in vacuo* to beta-acetyl-ethyldiethylamin and beta-acetyltrimethylenetetraethyldiamin. The former base is a colorless oil having an intense ammoniacal smell difficultly soluble in water and boils at 72–76° C. (16 mm.), the latter one represents a colorless and odorless oil with a little yellow coloration boiling at 95–100° C. (7–8 mm.).

Example 2.—Production of beta-acetylpropyl-diethylamin

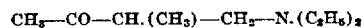

or beta-beta-acetyl-methyltrimethylenetetraethyldiamin

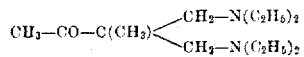

from tetraethyldiaminomethane and methylethylketone: 150 parts of an aqueous diethylamin solution (2 molecules) are gradually dropped into 25 parts of aqueous formaldehyde (40 per cent., 1 molecule) while well stirred and cooled. This mixture forming two layers is mixed with 150 parts of methylethylketone and boiled with the reflux condenser until a test portion after acidulating with acetic acid is not any more rendered turbid by a solution of anilin acetate which requires some hours. The solution is then dehydrated with potash and dried over potash. The excess of methylethylketone is now distilled off, advantageously under somewhat reduced pressure in an apparatus suitable for fractional distillation and the remaining mixture of bases is decomposed by a fractional distillation in vacuo to beta-acetyl-propyl-diethylamin and beta-beta-acetyl-methyltrimethylenetetraethyldiamin. The former represents a colorless oil with a little ammoniacal smell, difficultly soluble in water boiling at 77–78° C. (16 mm.), the latter is a thick, yellowish, almost odorless oil which boils at 105–110° C. (7 mm.)

It will be seen that the above keto compounds contain the radical or nucleus graphically represented:

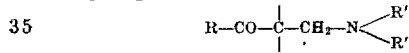

where R is alkyl, e. g., methyl, and R' represents ethyl or its higher homologues.

In our copending application Serial No. 768071 we have claimed generically the use of the higher dialkylaminomethane compounds for forming keto compounds, such as those above described, and we have also claimed specifically in that application the use of the higher dialkylaminooxymethanes; while the claims of the present application are drawn specifically to the use in this process of the higher tetraalkyldiaminomethanes.

We claim:—

1. The process of producing a polyalkylamino substituted keto compound which comprises reacting on a ketone with tetraalkyldiaminomethane in which the alkyl groups contain more than one carbon atom until the two fold introduction of the dialkyl-aminomethyl radical has been effected.

2. The process of producing a dialkylamino substituted ketone which comprises reacting on a ketone with tetraalkyldiaminomethane in which the alkyl groups contain more than one carbon atom.

3. The process of producing a polyalkylamino substituted keto compound which comprises reacting on a ketone with tetraalkyldiaminomethane in which the alkyl groups contain more than one carbon atom with the addition of a condensing agent until the two fold introduction of the dialkylaminomethyl radical has been effected.

4. The process of producing a dialkylamino substituted keto compound which comprises reacting on a ketone with tetraalkyldiaminomethane in which the alkyl groups contain more than one carbon atom with the addition of a condensing agent.

5. The process of producing a polyalkylamino substituted keto compound which comprises reacting on a ketone with tetraalkyldiaminomethane in which the alkyl groups contain more than one carbon atom with the addition of an inorganic base as a condensing agent until the two fold introduction of the dialkyl-aminomethyl radical has been effected.

6. The process of producing a polyalkylamino substituted ketone which comprises reacting on a ketone with tetraalkyldiaminomethane in which the alkyl groups contain more than one carbon atom with the addition of an inorganic base as a condensing agent.

7. The process of producing keto compounds containing the group:

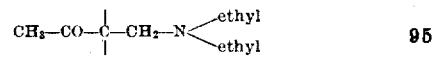

which comprises treating a methyl ketone with tetraethyldiamino methane.

8. The process of producing keto compounds containing the group:

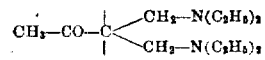

which comprises treating a methyl ketone with tetraethyldiaminomethane until a twofold introduction of the diethylaminomethyl radical has been effected.

9. The process of producing keto compounds containing the nucleus

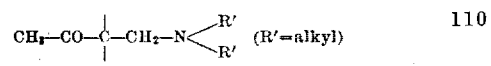

which comprises treating a methyl ketone with tetraalkyldiaminomethane in which the alkyl groups contain more than one carbon atom.

10. The process of producing keto compounds containing the nucleus

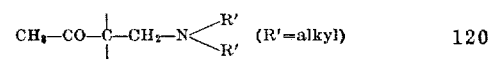

which comprises treating a methylketone with tetraalkyldiaminomethane in which the alkyl groups contain more than one carbon atom with the addition of an inorganic base as a condensing agent.

11. The process of producing keto compounds containing the radical

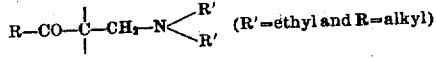

which comprises treating a ketone with tetraethyldiaminomethane.

12. The process of producing keto-compounds containing the radical or nucleus

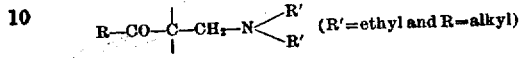

which comprises treating a ketone with tetraethyldiaminomethane with the addition of a condensing agent.

In testimony whereof we have hereunto set our hands in the presence of two subscribing witnesses.

GEORG MERLING. [L. S.]
OTTO CHRZESCINSKI. [L. S.]
HUGO KÖHLER. [L. S.]

Witnesses:
HELEN NUFER,
ALBERT NUFER.

Correction in Letters Patent No. 1,094,160.

It is hereby certified that in Letters Patent No. 1,094,160, granted April 21, 1914, upon the application of Georg Merling and Otto Chrzescinski, of Elberfeld, and Hugo Köhler, of Leverkusen, near Cologne, Germany, for an improvement in "Processes of Producing Keto Compounds from Ketones and Tetraalkyldiaminomethanes," an error appears in the printed specification requiring correction as follows: Page 1, line 43, second line of formula, second parentheses, for "$(C_2H_6)$" read $(C_2H_5)$; and that the said Letters Patent should be read with this correction therein that the same may conform to the record of the case in the Patent Office.

Signed and sealed this 30th day of June, A. D., 1914.

[SEAL.]

R. F. WHITEHEAD,
*Acting Commissioner of Patents.*